United States Patent [19]

Forss

[11] 4,450,106
[45] May 22, 1984

[54] LIGNIN PRODUCT FOR LOWERING THE VISCOSITY OF CEMENT AND OTHER FINELY-DIVIDED MINERAL MATERIAL SUSPENSIONS

[75] Inventor: Bengt Forss, Pargas, Finland

[73] Assignee: Flowcon Oy, Toijala, Finland

[21] Appl. No.: 511,994

[22] Filed: Jul. 8, 1983

Related U.S. Application Data

[63] Continuation of Ser. No. 374,755, May 4, 1982, abandoned, which is a continuation of Ser. No. 204,002, Nov. 4, 1980, abandoned.

[30] Foreign Application Priority Data

Nov. 5, 1979 [FI] Finland ............................ 793453

[51] Int. Cl.$^3$ ........................... C07G 1/00; D21C 3/20
[52] U.S. Cl. ............................. 260/124 R; 162/72
[58] Field of Search ........................... 260/124; 162/72

[56] References Cited

U.S. PATENT DOCUMENTS

| | | | |
|---|---|---|---|
| 3,168,511 | 2/1965 | King et al. | 260/124 |
| 3,180,787 | 4/1965 | Adam | 260/124 |
| 3,671,428 | 6/1972 | Kin | 260/124 |
| 3,825,526 | 8/1971 | Forss | 260/124 |
| 4,069,217 | 1/1978 | Detroit et al. | 260/124 |
| 4,178,861 | 12/1979 | Vanderhoek et al. | 162/72 |
| 4,181,652 | 1/1980 | Detroit | 260/124 |
| 4,213,821 | 7/1980 | Vanderhoek et al. | 162/72 |
| 4,219,471 | 8/1980 | Detroit | 260/124 |
| 4,248,663 | 2/1981 | Kubes et al. | 162/72 |
| 4,250,088 | 2/1981 | Yang | 260/124 |

OTHER PUBLICATIONS

The Chemistry of Lignin, (1960) 120, 121.

*Primary Examiner*—Delbert R. Phillips
*Attorney, Agent, or Firm*—Finnegan, Henderson, Farabow, Garrett & Dunner

[57] ABSTRACT

A lignin product for dispersing cement and other finely divided mineral materials, such as clays and equivalent, and for plasticizing their water mixtures. The product is large-molecular such that at least 40 percent of the material consists of molecules whose molecular weight is higher than 10,000. The sulfonation degree of said lignin product is lower than 0.4. The product is obtained from a cellulose cooking to which have been added catalysts preventing the splitting and dissolution of carbohydrates, such as amines, quinone and/or antraquinone derivatives or equivalent, in order to stabilize the cellulose and the hemicellulose during the cooking. The lignin product has been isolated from the spent liquor by using ultrafiltration, and/or complementary ion exchange.

3 Claims, No Drawings

LIGNIN PRODUCT FOR LOWERING THE VISCOSITY OF CEMENT AND OTHER FINELY-DIVIDED MINERAL MATERIAL SUSPENSIONS

This is a continuation of application Ser. No. 374,755, filed May 4, 1982, which is a continuation of application Ser. No. 204,002, filed Nov. 4, 1980, both now abandoned.

The present invention concerns a lignin product for dispersing cement and other finely divided mineral materials, such as clays and equivalent, and for plasticizing their water mixtures.

In modern concrete-prefabrication industry one aims at a concrete of high early strength but, at the same time, good workability of the green concrete, A natural requirement is that the concrete is at the same time as inexpensive as possible and that it otherwise meets all the other ordinary requirements in respect of strength and durability.

The strength of concrete depends—the other factors being constant—on the ratio of the quantities of water and air to the quantity of the binder agent, in accordance with the law suggested in 1919 by the American Duff Abrahams. Thus, in order to achieve high strength, the quantity of water and air must be kept as low as possible and/or the quantity of binder must be increased.

In the concrete-prefabrication industry, both possitilities are taken advantage of to the utmost in order to achieve high early strength. High quantity of binder, however, increases the expenses and causes deformations higher than normal in the concrete. Owing to the reduced quantity of water, the working quality of the concrete is deteriorated, and heavy vibration of the concrete mould is required in order to ensure satisfactory filling of the mould, despite the use of plasticizing concrete admixtures lowering the viscosity.

Attempts have been made to eliminate these difficulties by using so-called "super-plasticizers" or liquefiers. With the aid of these strong surface-active admixtures of concrete, the concrete mix becomes very fluid but it, nevertheless, possesses good strength properties.

These concrete liquefiers include, among other things, sulfonated alkali salts of melamin-formaldehyde polymers, lignosulfonic acids and their earth-alkali and alkali salts, alkali salts of naphthalene-sulphonic acids and of their polymers, as well as certain hydroxy-carboxylic acids and their alkali salts.

These chemicals mentioned above and their mixtures, together with many other chemicals as well, have been used to reduce the requirement of water in typical concrete for a certain workability and in this way to increase its strength as well as, when necessary, to retard its hardening in the desired way.

It is lignosulfonates that have been used most abundantly for the purpose described above, because lignosulfonates have traditionally been the most inexpensively available chemicals improving the plasticity of concrete. Since the lignosulfonates almost always contain sugars or small-molecule polymers of sugars, which have detrimental retarding effects on the stiffening and the hardening, typically attempts have been made to use such lignin products from which a major part of the sugars have been eliminated by means of alcohol or yeast production process by fermentation.

However, it has been ascertained that even purified lignosulfonates cannot be added to Portland cement concretes in quantities exceeding 0.2 to 0.4 percent without retarding the hardening of the concrete. On the contrary, if gypsum-free cement is used as binder, e.g., in accordance with the U.S. Pat. Nos. 3,689,294, 3,960,582, 3,959,004, and 4,032,351, higher quantities of lignosulfonates and sulfonated lignins can be used without a detrimental retarding effect.

In the U.S. Pat. No. 3,960,582 (F. Ball) it is stated that a lignin salt of an alkali or earth-alkali metal or sulfonated lignin, in practice Na- or Ca-sulfite spent liquor together with an alkali metal bicarbonate, such as $NaHCO_3$ or $KHCO_3$, can be used in order to improve the plasticity of concrete and to retard an excessively rapid hardening.

In all publications in which sulfonated lignin is mentioned, this means a lignin product that has been obtained from alkaline cooking of so-called sulphate cellulose and that has been sulfonated afterwards. This said sulfate lignin product has the advantage that, as a rule, it does not contain sugars, but instead it does contain quite an abundance of sugar acids.

The Soviet scientists V. L. Popova, H. V. Gripanova, R. G. Gimasbeva, and R. K. Boyarskaja (Gidroliznaja i Lasokhomicheskaja Promyslennost, No. 4 pp 13–14, 1977) have studied the effect of the purity of lignin on its dispersing property, and they have noticed that alcohol fermentation improves the dispersing property of spent liquor. The above scientists have further noticed that, when spent liquor is evaporated to a higher concentration, the product functions as an even better dispersing agent, e.g., for kaolin. The scientists explain that this results from the fact that furfural, which is always present in the spent liquor to some extent, causes a certain polymerization, and the larger-molecule product produced in this way operates as a better dispersing agent than the same product as of smaller molecules.

In several publications the relationship between the effects of alkali metal lignosulfonate and earth-alkali metal lignosulfonate is also discussed. E.g., in the book M. R. Rixom, Chemical Admixtures for Concrete, E & F. N. Spon Ltd, London 1978, it is ascertained on page 8 that Na-lignosulfonates are, owing to their higher solubility and higher ionizability, more advantageous than Ca-lignosulfonates and therefore operate better as dispersing agent.

In the tests affecting the creation of this invention it has, however, been established where the differences between different lignin products as dispersing agents and as plasticizers of cement mix come from, and on the basis of the new surprising discovery made, it has been possible to provide a lignin product contributing to a better dispersion and plasticizing of concrete as compared with what has been possible so far.

It has been surprisingly ascertained that the allegations about the different effects of different alkali metal lignosulfonates mainly result from the circumstance that in the cooking of cellulose, wherein different bases are already used, i.e., different cations, such as Na, Mg, Ca, $NH_4$, different pH-values are usually also used, which result from different quantities of $SO_2$ in the preparation of the cooking liquor.

Owing to the above, the attention was directed at the number of sulfone groups fixed to the lignin. In many commercial liquefiers of concrete, sulfonated polymerized naphtalene is used or, on the other hand, when melamine formaldehyde resin is used, this is also used preferably as sulfonated so that one sulfonic acid group is fixed per each cyclic compound. In such a situation it is said that the sulfonation degree is one. The polymerization degree os such commercial sulfonated polymers, prepared out of melamin formaldehyde resin, is usually relatively low, which is seen in the low viscosity of the commercial products. It has been said that, in the case of sulfonated melamin resins, even molecular weights as high as 30,000 are advantageous, but the viscosity of such products is high and hampers the mixing of the resin solution into the concrete mix.

In the typical lignin present in a spent liquor from the cooking of cellulose, one group of sulfonic acid groups is fixed per two units of phenylpropane, in which case it is said that the sulfonation degree is 0.5. A typical lignin of spent liquor consists of a very high number of different molecule sizes, the range of molecular weithts extending from a few hundreds up to 100,000.

As found by many scientists, it has been possible to improve the properties of sulphite spent liquor by treating the liquor in different ways. It is well known that by fermenting the spent liquor to be used, whereby most of the sugars have been removed, better properties have been achieved from the viewpoint of plasticizing the concrete.

When all the affecting factors in the lignin molecule obtained from conifer wood have been studied systematically and, further, which combinations of these factors give the best properties, the following observations have been reached: In contrast to what is generally believed, a low sulfonation degree has proved best. Further, it has been established that a very low sulfonation degree of the lignin together with a very high molecular weight gives superb properties. In addition to these discoveries, it has proved advantageous if molecules with low molecular weight have been eliminated from the product. A product with a high molecular weight and low sulfonation degree is, as a rule, most advantageous as a Na-salt, because the solubility of Mg- and Ca-salts is lower. Such products with a naturally low sulfonation degree are obtained from pulp cooking in which the pH-value of the cooking is rather high, i.e. the quantity of sulphur dioxide is low. Such pulp cookings are also increasing to-day, because attempts are made to promote the achievement of a high fibre yield by means of a high pH, even a pH being on the alkaline side. Such a pulp cooking is typically either a so-called Na-sulphite cook, the pH of the spent liquor obtained from it being 4.5 to 5.5, whereas it is in a typical Ca-bisulphite spent liquor of the order of 2.5 and always lower than 4.0, or such an advantageous cook is such an alkali sulphite cook in which pH is higher than 7, typically 7 to 13. In these alkali sulphite cooks, wherein the pH is on the alkaline side, to-day some such catalyst accelerating the cooking is used more and more commonly as, despite the high pH, yields rapid cooking and as typically frequently functions as such an oxydating-reducing catalyst as protects the splitting of the cellulose chain and especially of hemicellulose, If, in the cooking of cellulose, in addition to low $SO_2$-content (=high pH), some catalyst protecting the cellulose and hemicellulose has been used, such as amines or some quinone or anthraquinone derivatives or combinations of same, a spent liquor has been produced that right from the beginning contains a very low extent of dissolved sugars. This is why the purification treatment of this solution is easier and less expensive that that of some other, corresponding solution that contains a higher extent of sugars and dissolved polysaccharides.

Such lignin products, preferably of a low sulfonation degree, are best separated from the spent liquor so that the small-molecule components are at the same time eliminated by using ultrafiltration, electrodialysis, or ion exchange for the fractioning of the spent liquor. Ultrafiltration is a method in which molecules are filtered through such a membrane with micropores as is sufficiently dense to hold molecules of large size. In ultrafiltration, difference in pressure makes molecules pass through the membranes, whereas in electrodialysis electrical durrent is used as an aid. Typically, such a membrane holds materials of a molecular weight of 5,000 to 50,000.

As it has been noticed now that such lignin products of large molecules and low sulfonation degree are very well suitable for improving the plasticity of water suspensions of, e.g., clay or corresponding products, it was assumed that these would be correspondingly suitable for cement and concrete products as well. This is, however, not automatically the case. Surprisingly it has been found that the same lignin product as mixed into cement or concrete as such does not produce any such change as would remarkably improve the plasticity and workability in clay and in similar suspension. However, if, together with such a lignin product of large molecules and low sulfonation degree, a base, such as a NaOH-solution, or $Na_2CO_3$ is added to the cement mix in a suitable quantity, a strong positive effect is produced immediately. This circumstance can be explained thereby that the higher the molecular weight and the lower the sulfonation degree of the lignin product at the same time, the more easily do the Ca-ions, present to a low extent as free, precipitate such a product, whereby it is no longer free in the solution.

More specifically, the lignin product in accordance with the invention is mainly characterized in that
- at least 40 percent of the material of the product consists of molecules whose molecular weight is higher than 10,000,
- the sulfonation degree of the product is lower than 0.4,
- the product is obtained from a pulping cook to which have been added catalysts, such as amines, quinone and antraquinone derivatives, or equivalent, preventing the splitting and dissolution of carbohydrates, in order to stabilize the cellulose and the hemicellulose during the cooking, and
- the product has been isolated from the spent liquor by using ultrafiltration and/or complementary ion exchange.

Below, the invention will be examined in more detail with the aid of a few exemplifying embodiments.

EXAMPLE 1

Herein a spent liquor fraction obtained from Na-sulphite cellulose cooking and prepared by means of ultrafiltration was used whose pH was 4.5 and whose purity, in measurements performed, could be ascertained as 95% of the dry substance of lignin and whose distribution of molecular weight was the following:

|  | 10,000 | 20,000 | 30,000 | 40,000 |
| --- | --- | --- | --- | --- |
| original liquor | >28% | >20% | >16% | >13% |
| studied product | >50% | >35% | >26% | >20% |

The studied product defined in this way was sulfonated into different degrees so that sulfonation degrees of 0.3, 0.37, 0.45, and 0.60 were obtained.

The liquefying effect of these products was tested by means of mortar prepared with the ratio of 1:3. The binder was a blended cement consisting of 90% of slag and 10% of Portland cement clinker. The specific surface area of the binder was about 500 sq.m per kg. The quantity of liquefier was 1.3% of the quantity of binder. As accelerator was added 1.3% $Na_2CO_3$ and as air detraining agent 0.1% of tributylphosphate. The results come out from the following Table 1.

TABLE 1

| Treatment | Sulf. degree | water/cement ratio | Immediate Flow (mm) | T 80 - 0(h) |
|---|---|---|---|---|
| Orig. liquor | 0.30 | 0.49 | 70 | 72 |
| Ultrafiltr. | 0.30 | 0.43 | 100 | 45 |
| Ultrafiltr | 0.37 | 0.43 | 95 | 10 |
| Ultrafiltr. | 0.45 | 0.43 | 83 | 20 |
| Ultrafiltr. | 0.60 | 0.47 | 75 | 62 |

T 80-0 means the time within which the constant 80 flow has become 0 mm, i.e., the mortar has totally lost its plasticity and workability. From the table it comes out that, with increased sulfonation degree, the liquefying effect of the product becomes weaker. As an appropriate T 80-0 time is normally considered 4 to 5 hours, which can, on the other hand, be prolonged, if required, by means of known retarders.

EXAMPLE 2

Here the same, typical liquor is compared, after it has been purified by means of ultrafiltration into different distributions of molecular weights. The testing took place by means of 1:3 mortar in the same way as in Example 1. The results are given in Table 2, from which it comes out that low sulfonation degree and high average molecular weight give the best results.

TABLE 2

| Liquor | Cook pH | Sulf. degree | % of molecular weight that is higher | | | | | Immed. Flow (mm) | T 80-0 (h) |
|---|---|---|---|---|---|---|---|---|---|
| | | | 5000 | 10000 | 20000 | 30000 | 40000 | | |
| 1. Plant A | 10 | 0.24 | 68.2 | 53.3 | 38.5 | 29.8 | 23.8 | 95 | 5.1 |
| 2. Plant A | 4.5 | 0.30 | 77.7 | 63.5 | 48.7 | 39.1 | 32.1 | 100 | 4.5 |
| 3. Plant B | 4.0 | 0.37 | 81.4 | 67.2 | 51.0 | 40.2 | 32.3 | 80 | 5.3 |
| 4. Plant A | 4.5 | 0.30 | 36.0 | 27.9 | 20.1 | 15.6 | 12.5 | 70 | 72 |

EXAMPLE 3

By means of mortar experiments it was ascertained that the quantity of lye addition had a great effect both on the liquefying effect and on the rate of hardening of the mortar. Results obtained with concrete are given in Table 3. The binder was blast furnace slag whose specific surface area was 470 sq.m/kg. The maximum aggregate size was 16 mm and the quantity of binder 400 kg/cu.m. The quantity of liquefier was 1.5% of ultrafiltered liquor from Plant A. The air detraining agent was 0.12% tributylphosphate.

TABLE 3

| water/cement ratio | % NaOH | temperature °C. | Slump (cm) | Compression strength (MN/sq.m) | | | |
|---|---|---|---|---|---|---|---|
| | | | | 6 h | 9 h | 3 days | 7 days |
| 0.400 | 0 | 40 | 7 | — | — | — | — |
| 0.360 | 0.5 | 43 | 6 | — | — | 0.5 | 0.7 |
| 0.365 | 1.0 | 47 | 23 | 13 | 13.5 | 15 | 18 |
| 0.340 | 1.5 | 43 | 20 | 14 | 15 | 22 | 23 |

TABLE 3-continued

| water/cement ratio | % NaOH | temperature °C. | Slump (cm) | Compression strength (MN/sq.m) | | | |
|---|---|---|---|---|---|---|---|
| | | | | 6 h | 9 h | 3 days | 7 days |
| 0.325 | 2.0 | 35 | 14 | 19 | 20.5 | 29 | 30 |
| 0.335 | 3.0 | 42 | 10 | 29 | 34 | 38 | 39 |

The test specimen was a cube of 10 cm. The heat curing took place at 70° C.

As noticed, the water/cement ratio can be reduced by increasing the addition of lye, at the same time as the increase in strength is accelerated remarkably.

There is obviously an optimum quantity for the base to be added, e.g. NaOH. In performed tests it has been noticed that the effect of an addition of lye or of salts with alkaline reaction starts again deteriorating the result if the lye of the salts with alkaline reaction are used in excessively high quantities as calculated in relation to the quantity of the lignin product used for dispersion, An appropriate quantity of 0.5 to 3.0 times the dry-substance quantity of the lignin product.

EXAMPLE 4

1 liter of sulphite spent liquor (ultrafiltration treatment liquor 3. Plant B, TABLE 2) having the following composition
lignosulfonates: 95 g/l
Na: 9 g/l
sugars: 6 g/l
(pH=5.5)
was allowed to flow through a column in which 3 liters of anion exchange resin in Cl$^-$ form was present.

The resin was washed three times with 3 liters of water. The resin was then eluted with 1 liter of 1-n NaOH solution and 2 liters of water and the solution so obtained was analyzed, the result being:
lignosulfonates: 31 g/l
Na: 40 g/l
sugars:
clorides: 4 g/l
(pH=12.8).

EXAMPLE 5

1 liter of the solution mentioned in Example 1 was extracted with 1 liter of a 20 percent methyl-isobutyl ketone solution of a bisulfite salt of a liquid anion exchange resin. The analysis of the aqueous solution after extraction was as follows:
lignosulfonates: 4 g/l
sugars: 6 g/l
Na: 9 g/l
(pH=5.0).

The organic phase was extracted with 1 liter of a 1-n NaOH solution. The analysis of the sodium lignosulfonate solution was as follows:
lignosulfonates: 92 g/l
sugars:

NaOH: 80 g/l (pH=13.5).

From the following TABLE 4 appears the influence of sodium lignosulfonate and sodium hydroxide on the consistency of paste of clay for tile production.

TABLE 4

| Amount of ligno-sulfonate (% weight) | NaOH (% weight) | Water/ Clay ratio | Immediate flow = Increase of Cone diameter (mm) | Flow increase after 30 jolts (mm) |
| --- | --- | --- | --- | --- |
| — | — | 0.48 | 0 | 60 |
| 0.5 | — | 0.28 | 0 | 60 |
| 0.5 | 1.0 | 0.28 | 190 | >200 |
| 1.0 | — | 0.28 | 0 | 50 |
| 1.0 | — | 0.29 | 0 | 60 |
| 1.0 | — | 0.32 | 0 | 100 |
| 1.0 | 1.0 | 0.28 | 90 | >200 |

From the following TABLE 5 appears the influence of lignosulfonate and sodium hydroxide on the consistency of cement paste (OPC cement).

TABLE 5

| Amount of ligno-sulfonate (% weight) | NaOH (% weight) | Water/ Cement ratio | Immediate flow = Increase of Cone diameter (mm) | Flow increase after 30 jolts (mm) |
| --- | --- | --- | --- | --- |
| — | — | 0.28 | 0 | 100 |
| 0.5 | — | 0.28 | 30 | >200 |
| 0.5 | 1.0 | 0.28 | 130 | >200 |
| 1.0 | — | 0.30 | 20 | 160 |
| 1.0 | 1.0 | 0.30 | 0 | 140 |

What is claimed is:

1. In a method for producing a lignin product suitable for dispersing cement or other finely divided mineral materials which comprises adding amines, quinone or anthraquinone derivatives as catalysts to a pulping cook to prevent the splitting and dissolution of carbohydrates and to stabilize the cellulose and the hemicellulose during the cooking, the improvement wherein said lignin product is isolated from the spent liquor by ultrafiltration and/or ion exchange to produce a lignin sulfonate product in which at least 40 percent of the molecules have molecular weights higher than 10,000 and which product has a degree of sulfonation lower than 0.4.

2. The method of claim 1 wherein the product is isolated from the spent liquor by ion exchange.

3. The method of claim 1 wherein the product is isolated from the spent liquor by ultrafiltration and complementary ion exchange.

* * * * *